Feb. 7, 1939.  W. MAISCH  2,146,506
MICROSCOPE
Filed Nov. 14, 1936
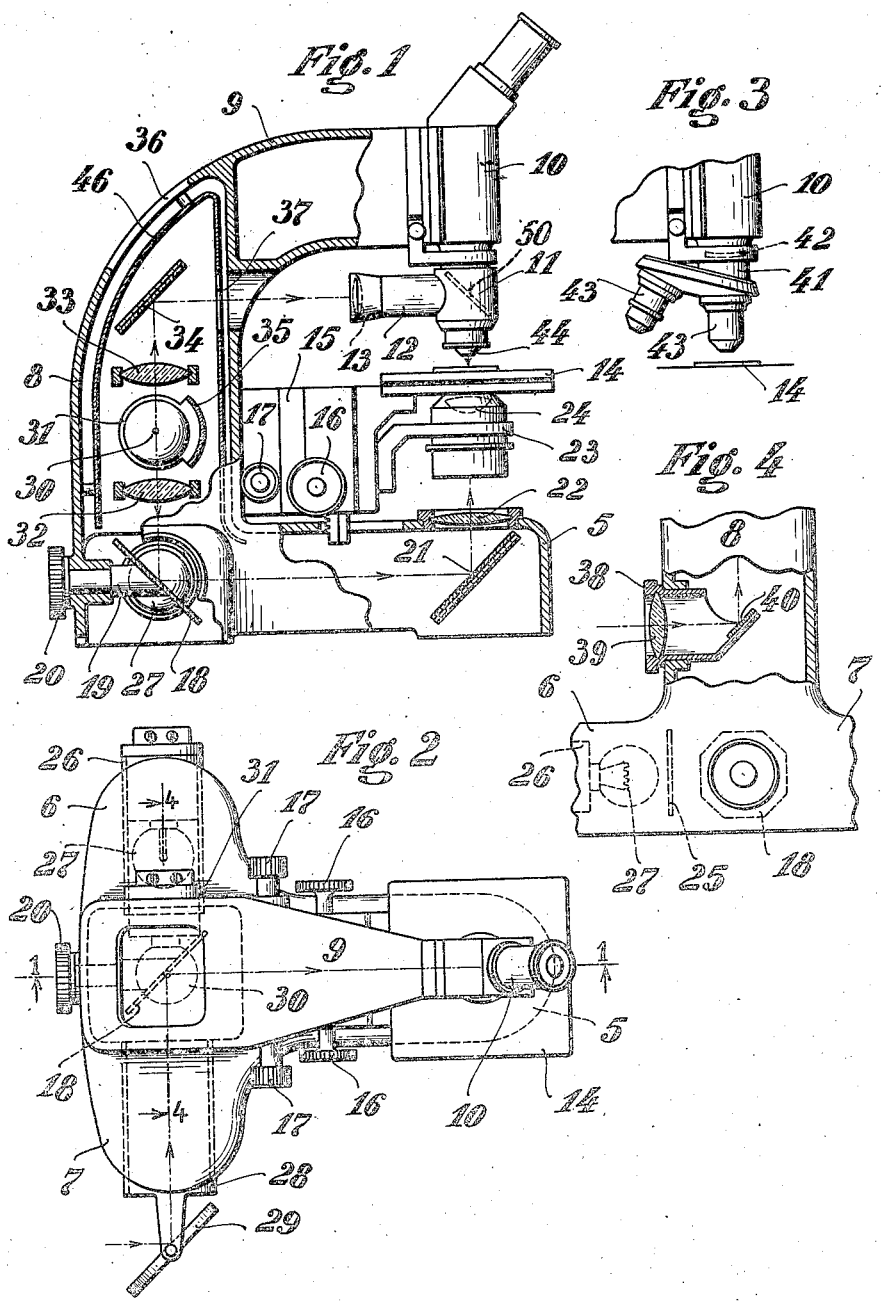
INVENTOR
Wilhelm Maisch
BY
Ivan E. A. Konigsberg
ATTORNEY Patented Feb. 7, 1939

2,146,506

UNITED STATES PATENT OFFICE 2,146,506

MICROSCOPE

Wilhelm Maisch, Wetzlar, Germany, assignor to Ernst Leitz, G. m. b. H., Wetzlar, Germany Application November 14, 1936, Serial No. 110,861
In Germany December 21, 1935

6 Claims. (Cl. 88—39)

The object of this invention is to provide a generally improved microscope embodying certain novel features respecting the placing of the illuminating means and the general arrangement of parts whereby to provide a microscope which is more convenient to operate and use and in which several types or kinds of illumination may be employed for specific purposes.

One object of the invention is to provide a microscope in which the coarse and fine adjustments are located below the stage and so arranged that they may be conveniently manipulated without hindrance by other parts. Another object is to provide a microscope support which is hollow and in which the lamps and lens systems are supported in a manner to prevent the light rays from striking the eyes of the operator and in which these parts are conveniently operable from the outside. Another object is to provide certain exchangeable units so that outside illuminating sources may be used. Still another object is to provide one or more lamps within the hollow microscope support together with means whereby all or only a portion of such illumination may be used.

With the above and other ancillary objects in view, all of which will be referred to hereinafter, the invention is embodied in a microscope arranged and constructed as hereinafter set forth and as illustrated in the accompanying drawing in which Fig. 1 is a side view of the microscope with parts in section and parts broken away, the section being taken substantially on line 1—1 of Figure 2.

Fig. 2 is a plan view of the microscope.

Fig. 3 is a detail view illustrating a rotatable eye piece carrier which may be used with the microscope in Figure 1.

Fig. 4 is a detail sectional view taken substantially on line 4—4 of Figure 2 and showing the exchangeable unit for using an outside source of illumination. This figure is a rear view.

Referring to the drawing the microscope support or stand is a hollow casting forming a forward foot 5, a right foot 6 and a left foot 7 as the microscope is viewed from the right in Figure 2 where the operator stands. The hollow feet merge into the centrally and rearwardly disposed vertical hollow pillar 8 which in turn forms an overhanging arm 9 for the support of the objective tube 10 in the usual manner. A nose piece 11 with objective 44 may be attached to the objective tube and may include an extension 12 with a suitable lens system indicated at 13 and a downwardly reflecting transparent member indicated at 50, the purpose of which will be explained later.

The pillar 8 supports the stage 14 by means of a bracket 15 which may be adjusted as usual by a coarse and fine adjustment operated by the knobs 16 and 17 respectively. The adjustments are operable from both sides of the microscope as shown in Figure 2.

An object on the stage 14 may be illuminated selectively in several different ways. For these purposes there is mounted centrally of the pillar 8 in the lower part thereof a rotatable reflecting mirror 18 upon a shaft 19 having an outside knob 20. In optical alinement with said mirror the front foot 5 carries another reflecting mirror 21 and a lens 22 in the optical axis of the microscope tube. Below the stage 14 is supported a substage 23 with a lens 24.

The right microscope foot 6 supports a fixed blue glass screen 25 and a tube 26 having an electric lamp 27. The latter and the screen are in optical alinement with the center of the rotatable mirror 18. The left microscope foot 7 supports a rotatable tube 28 which on the outside of the microscope carries a swingable mirror 29. The pillar 8 supports an electric lamp 30 mounted in a detachable tube 31. Between the lamp 30 and the rotatable mirror 18 there is mounted a condenser lens 32. Above the lamp there is mounted another condenser lens 33 and a mirror 34. As shown in the drawing the parts 34, 33, 30, 32 and 18 are in vertical optical alinement. The lamp tube 31 is provided with a rotatable screen 35 which is adjusted by rotating the tube. The pillar 8 supports a lining member or shell 46 spaced from the pillar. The shell is perforated and provides ventilation for the pillar, the heat from the lamp escaping through openings in the shell and through the ventilation opening 36 in the top of the pillar. The shell 46 is apertured as at 37 so that light may be reflected forwardly into the lenses 13 in the nose piece 11.

The above described elements may be operated to illuminate the object on the stage in several different ways. If the screen 35 be moved underneath the lamp 30 the object will be illuminated from above, the light rays passing from the lamp from above, the light rays passing from the lamp 30 upwards through the condenser 33 to the mirror 34 and thence to the reflector 50 in the nose piece 11 downwards to the object. Or the screen may be placed above the lamp 30 and the object will then be illuminated from below, the light rays passing from the lamp downwards through the condenser 32 and thence to the mirrors 18 and 21. By placing the screen as shown in Fig. 1 the object will be illuminated both from above and from below, the light rays passing as aforesaid.

If the rotatable mirror 18 is rotated into the position shown in Fig. 2 and the screen 35 placed below the lamp 30, the object will be illuminated by reflected daylight from the mirrors 29, 18 and 21 and at the same time the object may be illuminated from above from the lamp 30 as aforesaid. Of course it is possible to cut out the lamp altogether and illuminate the object only by reflected daylight from below. Again, the object may be illuminated from above by the lamp 30 and at the same time be illuminated from below with artificial daylight from the other lamp 27 from which the rays pass through the blue screen 26 before being reflected by the mirrors 18 and 21. The tube 31 and lamp 30 may be removed sideways, to the right of the pillar, and a rotatable fitting 38 with a condenser lens 39 and a mirror 40, see Figure 4, may be substituted. Then an outside source of light, for instance an arc light not shown, may be used. The rays from such a source will be reflected upwardly or downwardly by the mirror 40 depending upon its position when the tube 38 is attached to the pillar.

In Figure 3, the nose piece 11 has been removed and replaced with a revolving nose piece carrier 41 with lens 42 and which supports several objectives 43, 43. These latter are so positioned that the objectives which are not in use are moved rearwardly of the microscope tube 10 as shown.

From the foregoing description it will be observed that all the parts of the microscope which are to be manipulated one time or another by the operator are all located in front of the operator but to the rear of the stage and objective tube thereby leaving these latter elements free from obstruction of any kind and in full view. The coarse and fine adjustment knobs are easily and quickly reached there being no elements to obstruct or obscure. Similarly the operator may conveniently select the type of illumination desired and by very simple adjustments position the parts accordingly.

I claim:—

1. A microscope including a stage and a device for reflecting light rays downwardly upon the stage, an electric lamp, means for reflecting light rays from said lamp to the said reflecting device to illuminate an object on the stage from above, means for reflecting light rays from the lamp to illuminate an object on the stage from below, including a rotatable mirror interposed between the lamp and the stage, a second electric lamp and a blue screen in cooperative relation with said movable mirror for illuminating the object from below with artificial daylight in place of the aforesaid illumination from the first lamp and together with or exclusive of the aforesaid illumination from above and a hollow microscope stand enclosing and supporting the said two lamps and the said reflecting means and screen, said hollow stand forming channels for the passage of the said reflected light rays.

2. A microscope of the character described, including a body formed to provide a hollow base having a vertically directed light opening, a hollow standard communicating with and supported by said base, said standard being provided with a forwardly directed light opening, a stage carried by said standard above the first named opening, light directing means carried by the standard above the stage and alined with the second opening, a clear lamp supported within the standard between said openings, a lamp for producing artificial daylight supported within the standard beneath and laterally spaced from the clear lamp, and a movably supported reflecting means carried by the body so as to be placed in optical alinement with either of said lamps, whereby the stage may be selectively illuminated from above and below by the clear lamp or from below by the second lamp.

3. A microscope in accordance with claim 2, in which a movable light screen is supported within the standard adjacent the clear lamp for selectively preventing the passage of light therefrom through either of said openings.

4. A microscope of the character described including a hollow body formed to provide a base, a standard extending vertically from the base, a stage carried by the standard, said base having a vertically disposed opening in optical alinement with the stage and a pair of horizontally opposed alined openings spaced from said vertical opening, a light directing member supported by the base adjacent said vertical opening, a lamp for producing artificial daylight disposed in one of the horizontal openings, a light reflecting element movably supported adjacent the other of said horizontal openings, and a movably supported reflecting means carried by the base between the lamp and the reflecting element so as to be placed in optical alinement with either the lamp or the reflecting element whereby to selectively illuminate the stage with light from either the lamp or the said light reflecting element.

5. A microscope of the character described including a hollow stand formed to provide a T-shaped base and a communicating hollow standard arising vertically from the base each of the arms of the base having a light admitting opening in its outer free end, a stage carried by said standard, an opening in the latter for the passage of light from either of the said two light admitting openings to the stage and means within said hollow stand for receiving light rays from either one of the said two light admitting openings and directing the same through the said opening in the standard towards the stage whereby to illuminate an object carried by the latter.

6. A microscope in accordance with claim 5, in which the light receiving and directing means is movable so as to selectively receive the light from either of the said two light admitting openings and direct the same through the said standard opening, whereby to illuminate the stage.

WILHELM MAISCH.